US010616245B2

United States Patent
Barak et al.

(10) Patent No.: US 10,616,245 B2
(45) Date of Patent: Apr. 7, 2020

(54) REAL-TIME REMEDIATION RESPECTIVE OF SECURITY INCIDENTS

(71) Applicant: Pao Alto Networks, Inc., Santa Clara, CA (US)

(72) Inventors: Gil Barak, Ra'anana (IL); Shai Morag, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 197 days.

(21) Appl. No.: 14/952,326

(22) Filed: Nov. 25, 2015

(65) Prior Publication Data

US 2016/0149938 A1 May 26, 2016

Related U.S. Application Data

(60) Provisional application No. 62/084,581, filed on Nov. 26, 2014.

(51) Int. Cl.
*H04L 29/06* (2006.01)

(52) U.S. Cl.
CPC ........ *H04L 63/1416* (2013.01); *H04L 63/145* (2013.01)

(58) Field of Classification Search
CPC .................... H04L 63/1416; H04L 63/1441; H04L 63/145
See application file for complete search history.

(56) References Cited

U.S. PATENT DOCUMENTS

| 8,910,288 B2* | 12/2014 | Young | G06F 21/552 713/189 |
| 9,363,282 B1* | 6/2016 | Yu | H04L 63/1425 |
| 2005/0257269 A1* | 11/2005 | Chari | H04L 63/145 726/25 |
| 2009/0021343 A1* | 1/2009 | Sinha | H04L 63/1408 340/5.2 |
| 2009/0164522 A1* | 6/2009 | Fahey | H04L 63/1441 |
| 2011/0023115 A1* | 1/2011 | Wright | G06F 21/552 726/22 |
| 2011/0238855 A1* | 9/2011 | Korsunsky | G06F 21/55 709/231 |
| 2014/0082001 A1* | 3/2014 | Jang | G06F 21/552 707/755 |

(Continued)

OTHER PUBLICATIONS

Richard Noel. "Global Information Assurance Certification Paper: Building a Security Test Environment" © 2003 SANS Institute. (pp. 1-11) https://www.giac.org/paper/gsec/2730/building-security-test-environment/104653.*

(Continued)

*Primary Examiner* — Joseph P Hirl
*Assistant Examiner* — Thomas A Gyorfi
(74) *Attorney, Agent, or Firm* — Gilliam IP PLLC

(57) ABSTRACT

For remediation of security incidents occurring in a network, forensic data which is collected from devices connected to a network is analyzed. A security incident is detected based on the analysis of the forensic data. Based on detecting the security incident, a source which is affected by the security data is identified based, at least in part, on attributes of the forensic data. The affected source is isolated from the network. Information about the affected source in association with an indication of the security incident and an indication of the isolating is stored.

20 Claims, 5 Drawing Sheets

(56) References Cited

U.S. PATENT DOCUMENTS

| | | | |
|---|---|---|---|
| 2014/0208426 A1* | 7/2014 | Natarajan | H04L 63/1416 726/23 |
| 2015/0200958 A1* | 7/2015 | Muppidi | H04L 41/28 726/23 |
| 2016/0099960 A1* | 4/2016 | Gerritz | H04L 63/1433 726/23 |

OTHER PUBLICATIONS

Definition of "resource" from Webopedia. Article dated Feb. 14, 2008 from Internet Archive (1 page) http://web.archive.org/web/20080214113800/https://www.webopedia.com/TERM/R/resource.html.*

Definition of "URL" from Webopedia. Article dated May 3, 2013 by Internet Archive (1 page) http://web.archive.org/web/20130503082147/http://www.webopedia.com/TERM/U/URL.html.*

U.S. Appl. No. 14/944,773, filed Nov. 18, 2015 (unpublished), Title: A System and Method Thereof for Identifying and Responding to Security Incidents Based on Preemptive Forensics, cited on p. 6 of the Specification.

* cited by examiner

| SECURITY INCIDENT INFORMATION | AFFECTED ENTITY | DISABLED? | ANALYSIS RESULTS/RELEASED |
|---|---|---|---|
| 0X3; 11:10 - 11/4/13; 187654218; INPUT ATTRIBUTES [POINTER TO MEMORY LOCATION OF DATA FOR INPUT,....]; OUTPUT ATTRIBUTES [POINTER TO MEMORY LOCATION OF OUTPUT] | ① OUTLOOK APPLICATION<br>• ON USER DEVICE 1<br>• MEM LOCATION ○○○×x123<br>• ATTRIBUTES<br>• SOURCE | YES | |
| | ② PDF APPLICATION<br>• ON USER DEVICE 1<br>• MEM LOCATION ○○○×y857<br>• ATTRIBUTES<br>• OUTPUT | YES | |
| | ③ OPERATING SYSTEM<br>• ON USER DEVICE 1<br>• MEM LOCATION ○○○××7YZ<br>• ATTRIBUTES<br>• INTERNAL | NO | N/A |
| | | | |

FIGURE 5

REAL-TIME REMEDIATION RESPECTIVE OF SECURITY INCIDENTS

CROSS-REFERENCE TO RELATED APPLICATION

This patent application claims priority to U.S. Provisional Patent Application No. 62/084,581, filed on Nov. 26, 2014, which is hereby incorporated by reference in its entirety.

BACKGROUND

Field

Exemplary embodiments generally relate to data security, and more specifically, to a system, a computer readable medium, an apparatus, and a method for remediation of security incidents in a computerized environment.

Related Art

Nowadays, as organizations and enterprises get bigger, they are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks, and sometimes months.

These applications must be deployed into a computerized environment and attempt to identify malicious activity within the network. Other solutions are may also be known. For example, anti-virus solutions that detect and remove known viruses by identifying "signatures" of such viruses may be available. The majority of these solutions rely upon a basic engine that searches suspect files for the presence of predetermined virus signatures. However, these related art solutions for identifying security incidents are not effective enough and malicious activity may go undetected.

Furthermore, even in cases where malicious attacks are sufficiently identified, a significant amount of manual work is required in order to stop the attacks. More sophisticated attacks may further make it hard to remove malicious files that have in fact been identified. The removal of such malicious files may damage the operation of the system and may result in data loss and require cumbersome re-installments.

In the view of the shortcoming of related art approaches, it would be advantageous to provide an efficient solution for remediating security incidents in a computerized environment without affecting other portions of the system.

SUMMARY

An aspect, among other exemplary aspects, which will become apparent from reading the description herein of exemplary embodiments, is to provide a system, a method, a computer readable medium, and an apparatus to overcome the above-mentioned problems by accurately identifying and efficiently remediating security incidents in a computerized environment without affecting other portions of the system.

Illustrative, non-limiting embodiments may overcome the above-noted disadvantages and problems in the prior art, and also may have been developed to provide solutions to other disadvantages and problems that were not described above. However, a method, an apparatus, a system, and a computer readable medium that operates according to the teachings of the present disclosure is not necessarily required to overcome any of the particular problems or disadvantages described above. It is understood that one or more exemplary embodiment is not required to overcome the disadvantages described above, and may not overcome any of the problems described above.

According to an aspect of exemplary embodiments, a method of remediating at least one security incident in a computer network is provided. The method includes identifying, by a computer, at least one security incident in the computer network based on forensic data and identifying, by the computer, at least one resource affected by the security incident based on the identified security incident, suspending the at least one identified resource; and storing the identified at least one resource in a separate memory that is not connected to the computer network.

According to yet another aspect of exemplary embodiments, an apparatus of remediating at least one security incident in a computer network is provided. The apparatus includes a memory configured to store computer-executable instructions and a processor configured to execute the stored instructions. The instructions when executed configure the processor to: identify said at least one security incident in the computer network based on forensic data; identify at least one resource affected by the security incident based on the identified security incident; suspend the at least one identified resource; and store the identified at least one resource in a separate memory that is not connected to the computer network.

BRIEF DESCRIPTION OF THE DRAWINGS

The accompanying drawings, which are incorporated in and constitute a part of this specification exemplify the exemplary embodiments and, together with the description, serve to explain and illustrate exemplary embodiments. Specifically:

FIG. 5—is a view illustrating a table stored in an external memory according to an exemplary embodiment.

DETAILED DESCRIPTION OF EXEMPLARY EMBODIMENTS

Figure 1:
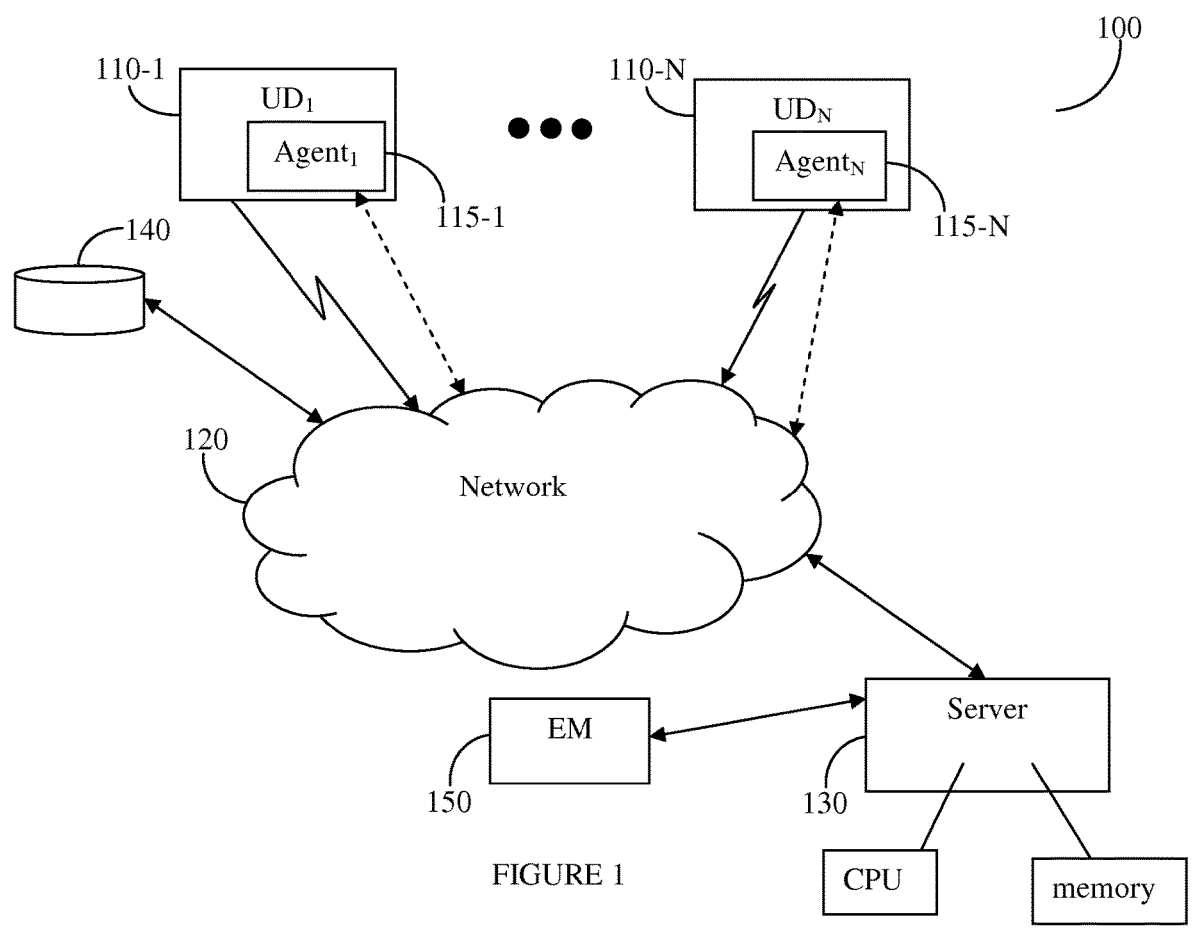
FIG. 1—is a block diagram of a network system according to an exemplary embodiment.

Exemplary embodiments will be described in detail herein with reference to accompanying drawings so as to be easily realized by a person having ordinary skill in the art. The exemplary embodiments should not be treated as limiting and it should be clear that several alternate embodiments and other alternate implementations are possible. Descriptions of well-known parts and steps are omitted for clarity.

It is important to note that exemplary embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

According to an exemplary embodiment, a system identifies at least one security threat in an enterprise's network. The system characterizes all sources affected by the security threat within the enterprise's network. According to an exemplary embodiment, the identification of the sources affected by the security threat is made respective of forensic data extracted by the system. The system then suspends all the affected sources. The system also stores the affected sources in a separate memory unit in order to prevent execution thereof.

FIG. 1 depicts an exemplary and non-limiting block diagram of a system 100 according to an exemplary embodiment. A plurality of user devices (UD) 110-1 through 110-N (collectively referred hereinafter as user devices 110 or individually as a user device 110, merely for simplicity purposes), where N is an integer equal to or greater than 1, are communicatively connected to an enterprise's network 120. The user devices 110 can be, but are not limited to, smart phones, mobile phones, laptops, tablet computers, wearable computing devices, personal computers (PCs), a combination thereof and the like. A user device may comprise a memory and a processor. A user device may further comprise a user input interface configured to receive user input, a display configured to display contents on a screen, and a communication interface such as a network card, configured to communicate with the network 120. The network 120 may comprise busses, local area network (LAN), wide area network (WAN), metro area network (MAN), worldwide web (WWW), Internet, as well as a variety of other communication networks, whether wired or wireless, and in any combination, that enable the transfer of data between the different elements or entities of the system 100. For example, the network 120 may be an enterprise's network which may include both private and public network.

A server 130 is further connected to the network 120. The server 130 identifies at least one security incident within at least the network 120, the user devices 110 or portions thereof. For example, as described in a U.S. patent application Ser. No. 14/944,773, filed on Nov. 18, 2015, which is incorporated herein by reference. A security incident, as identified by the server 130, may include, for example, malicious software program (Malware), a targeted threat, a combination thereof, etc. Malware may be a Resware, an Adware, a Spamware, a virus, a Botnet, a Spyware, a Trojan, a Crimeware, an advanced persistent threat (APT), and so on. These examples of a security incident are provided by way of an example and not by way of a limitation. Targeted threats may include demilitarized zone (DMZ) server threats, virtual private network (VPN) threats, remote desktop protocol (RDP) threats, universal serial bus (USB) devices installed maliciously, wire/less devices coupled/disconnected maliciously to or from the network 120, and so on. The security incident may be identified implicitly, by the server 130. Alternatively, the security incidents may be identified explicitly by security alert systems coupled to the server 130. The server 130 is then configured to identify resources or sources (used interchangeable herein) within the network 120, affected by the security incident.

According to an exemplary embodiment, the server 130 is configured to collect forensic data of the network 120. The forensic data may include, for example, but not by way of limitation, communication data, file system data, processes related to the network 120 of the user devices 110 coupled thereto, physical activity performed on the network 120, user activities within the network 120, modules within the network 120, activities performed by hardware devices coupled to the network 120, operating system processes in the user devices 110, a combination thereof, and more. Optionally, according to an exemplary embodiment, the collection of the forensic data may be performed by the server 130 using a plurality of agents 115-1 through 115-N installed respectively on the user devices 110. Each of the agents 115 may be implemented as an application program having instructions that may reside in a memory of the respective user device 110. Each agent 115 is communicatively connected to the server 130 over the network 120.

For example, each agent 115 may be a plug in being executed and running on a respective user device 100. Each plug in communicates with a main component that is executed and/or running on a server. The main component may include an application with communication interfaces for the agents 115 and a processing component that parses and analyzes forensic data images received from the respective agents. The main component may further include communication interfaces to communicate with other elements on the server and/or database.

Each agent 115 is configured to monitor the activity of the respective user device 110 over the network 120 and collect forensic data respective thereof. The forensic data is then sent to the server 130 for further analysis. The server 130 includes a memory and a processor. The server may further include a communication interface such as a network card to communicate with the user devices and an external memory 150 and databases 140 and optionally, a display. According to yet another example embodiment, the forensic data may be sent for storage to a database 140 communicatively coupled to the server 130 over, for example, the network 120. According to yet another exemplary embodiment, the forensic data collected by an agent 115 may be sent directly to the database 140 over the network 120. The database 140 is accessible by the server 130, thereby enabling the server 130 to analyze the forensic data upon demand. Upon identification of the security incident, forensic data associated with the security incident is extracted by the server 130 from the database 140 and one or more sources affected by the security incident are identified.

Respective of the analysis of the forensic data, the server 130 determines a normal and/or regular behavior pattern associated with the network 120, the user devices 110 as well as for portions thereof. The normal and/or regular behavior pattern(s) is set by the server 130 as a reference in order to monitor the operation of the network 120 and the user devices 110 thereafter, and to identify abnormal and/or irregular behavior respective thereof.

Upon identification of an abnormal and/or irregular behavior, the server 130 determines whether the abnormal and/or irregular behavior is potentially a security incident. A security incident, as identified by the server 130, may include, for example, malicious software program (Malware), a targeted threat, a combination thereof, etc.

The determination whether a security incident exists may be made by extracting forensic data associated with the abnormal and/or irregular behavior. The forensic data associated with the abnormal and/or irregular behavior may further be used by the server 130 in order to identify the source of the security incident. According to an exemplary embodiment, upon determination that the abnormal and/or irregular behavior is a security incident, the server 130 generates a real-time damage assessment respective of the security incident.

The server 130 then suspends the sources affected by the security incident. The suspension of the affected sources provides a real-time remediation to the security incident without affecting the operation of the network 120. The suspension further enables isolation of the affected sources without causing damages typically caused by removal of sources affected by security incidents from such networks. The server 130 then stores the affected sources in an external memory 150. The external memory 150 is hidden or otherwise unapproachable to one or more of the user devices 110. The storing of the affected sources in a separate storage prevents other users from activating and/or interacting with the affected sources.

Figure 2:
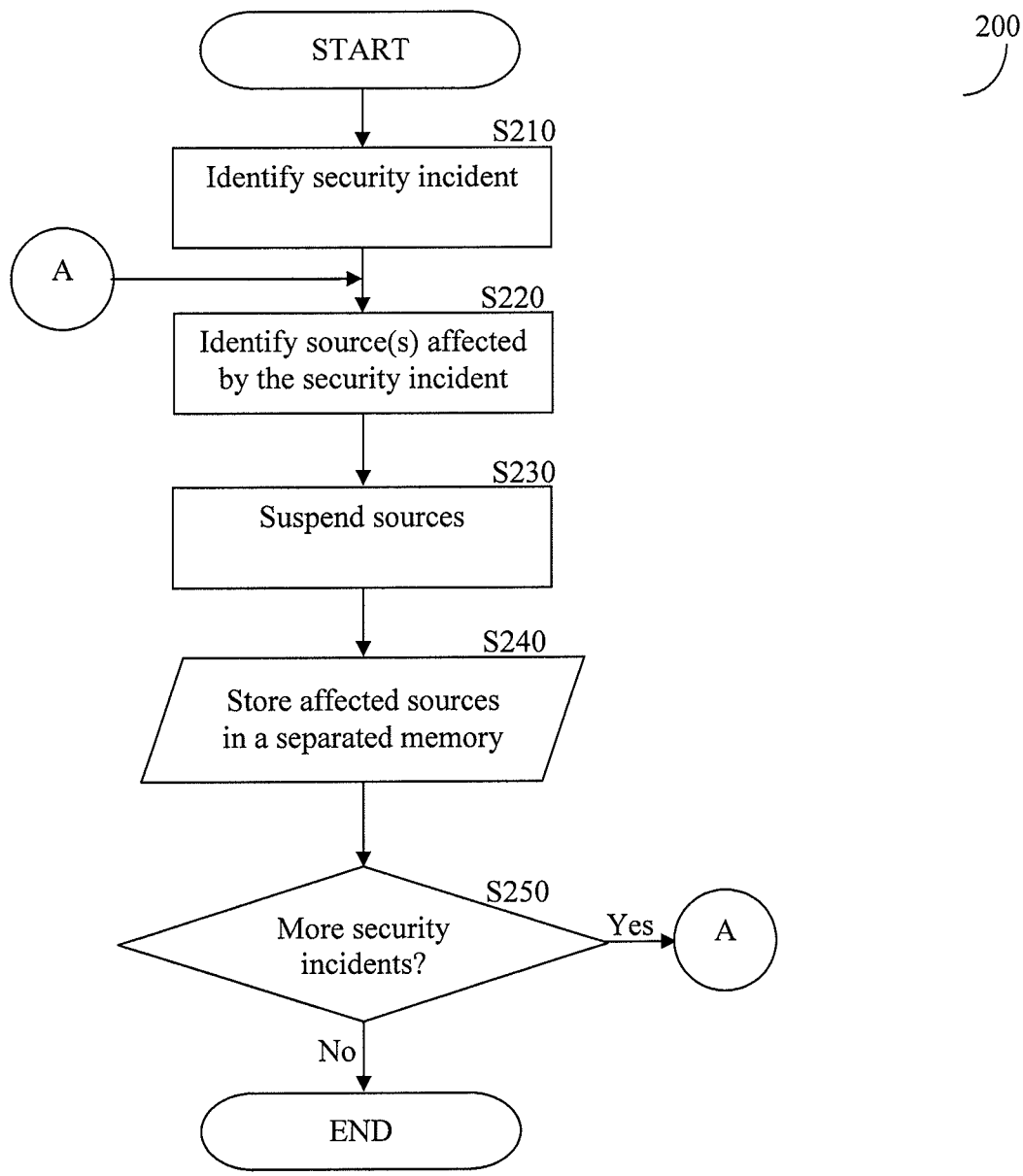
FIG. 2—is a flowchart illustrating a method of identifying security incidents in a computerized environment according to an exemplary embodiment.

FIG. 2 is an exemplary and non-limiting flowchart illustrating a method of remediating security incidents according to an exemplary embodiment. In operation S210, the operation starts when at least one security incident is identified within the network 120. In operation S220, the server 130 identifies sources within the network 120 affected by the security incident. According to an exemplary embodiment, and as further described hereinabove, by way of an example, with respect to FIG. 1, the affected sources are identified respective of forensic data associated with the security incident. For example, the forensic data associated with the security incident is examined such that a header is analyzed to determine the origination of the data. Based on the header, the source is moved to an affected sources list that is stored in an external memory 150, for example. A client device which attempts to perform suspect activities such as modifying its own operating system, deleting log files, etc. may be identified and moved to the affected sources list that is stored in the external memory 150. The identification is made respective of a type of the security incident. As a non-limiting example, in case certain files were accessed by an unauthorized user, the system 100 identifies the accessed files as well as files similar thereto as affected. In operation S230, the server 130 suspends the affected sources as further described hereinabove with reference to FIG. 1, by way of an example.

According to an exemplary embodiment, the suspension may include stopping allocation of CPU time to the affected processes. The names of the affected processes may then be changed, and they will be sent for storage in a separated data warehouse. According to another exemplary embodiment, in case the security incident occurred in the registry, the server 130 rolls back to the original values before the security incident occurred. According to another exemplary embodiment, in case a client device attempted to perform a suspect activity, the user's access password to the client device is changed and its permissions level may be limited. In operation S240, the server 130 sends the affected sources for storage in the external memory 150. In operation S250, it is checked whether to continue with the operation and if so, execution continues with operation S210; otherwise, execution terminates.

Figure 3:
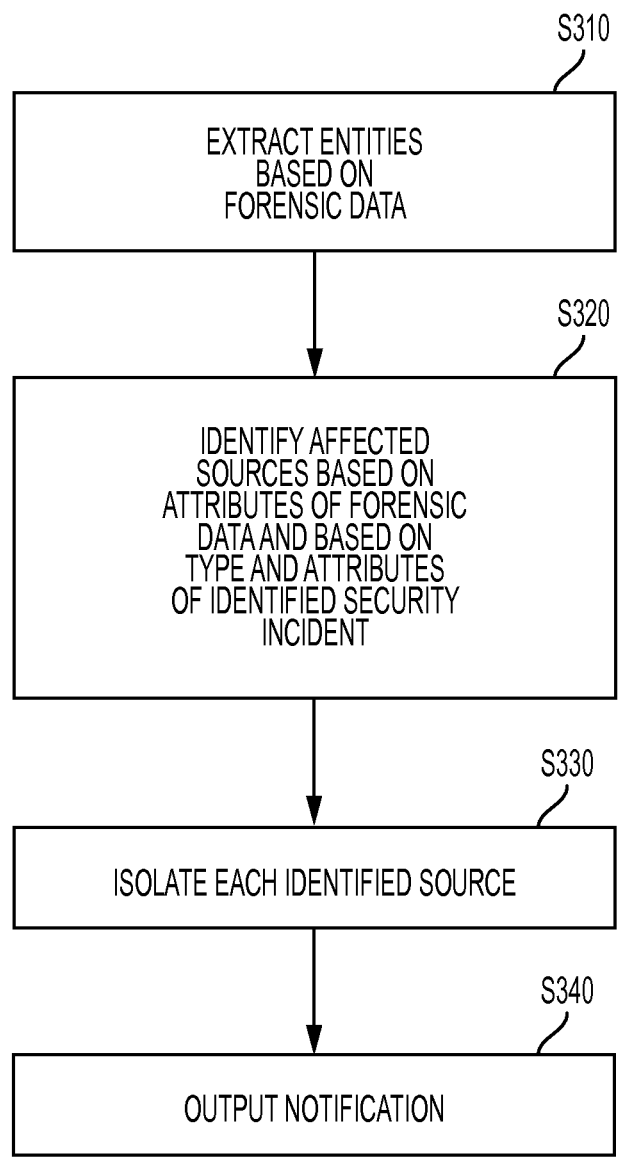
FIG. 3—is a flowchart illustrating a method of managing entities involved in a security incident according to an exemplary embodiment.

FIG. 3 is an exemplary, non-limiting flowchart illustrating a method of identifying and isolating affected sources according to an example embodiment. As shown in FIG. 3, in operation S310, the processor of the server analyzes forensic data related to the identified security incident that is stored for analysis in a memory of the server 130 and/or in the external database 140, to identify entities in the forensic data. In operation S320, for each extracted entity, its role in the security incident may be determined based on a set of rules and a type of security incident. For example, if the security incident is improper processing of data, then the sender of the data is not identified as an affected source and only an internal application and/or hardware processor which improperly processes the data may be identified as an affected source. By way of another example, type of forensic data may be examined to determine the affected source. For example, if the type of forensic data appears to be related to an outlook application, the outlook application may be identified as the affected source, as opposed to an entire hardware processor, a memory, and/or a user device that runs the outlook application. That is, in an example embodiment, attributes of the forensic data (such as type of forensic data, format of the forensic data, quantity of the forensic data, relationship between forensic data with each other, and so on) may be examined to determined affected sources. Additionally, type of the security incident as well as the attributes of the security incident may be used to determine the affected entities. In other words, in operation 320, affected sources are identified from the extracted sources based on forensic data attributes and based on type and attributes of the security incident.

Figure 4:
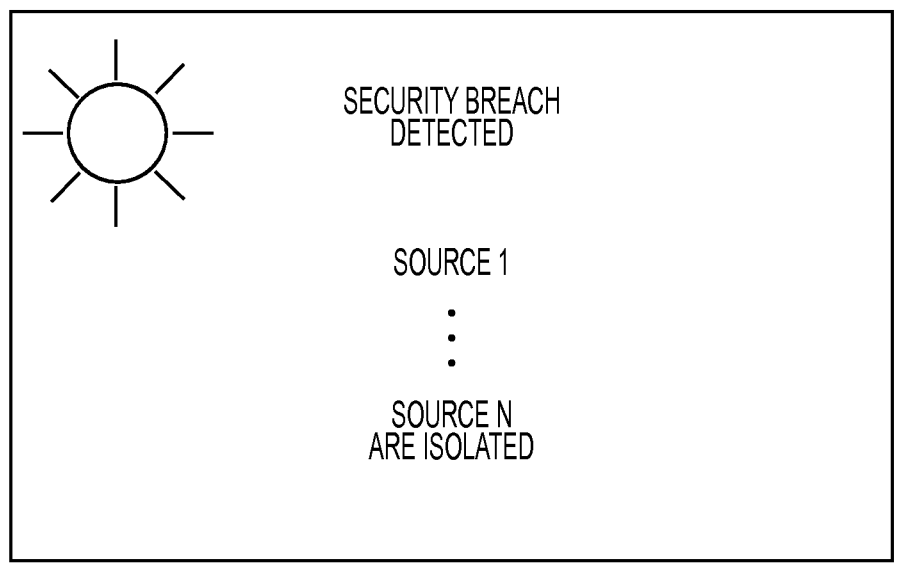
FIG. 4—is a view illustrating a notification regarding entities involved in a security incident according to an exemplary embodiment.

In operation 330, the affected sources are isolated from the network 120. In an exemplary embodiment, if the affected source is a user device 110-1, then the user device 110-1 is disconnected from the network for purposes of other user devices 110-2 . . . 110-N. However, the server 130 may store identification information such as an IP address, type of the user device, and other information in an external memory 150 for further analysis of the affected source. In an exemplary embodiment, if the affected source is an application running on a user device 110-1, the server 130 may command the user device 110-1 to disable the affected application and obtain identification information including a memory address where the affected application is stored. According to yet another example embodiment, the server 130 may request the user device 1110-1 to remove the affected application from its memory, delete the executable of the affected application, and so on, and to also forward an image of the affected application to the server 130 for analysis. In an exemplary embodiment, each of the affected sources are analyzed and isolated from the network including user devices 115-1 . . . 115-N. In operation 340, according to an exemplary embodiment, a notification may be output to a respective user device or one or more user devices in the network, which would identify the affected resource. As shown in FIG. 4, a notification may include a message being output on a display of one or more user devices and/or a server, which alerts a user that a security incident is detected and sources 1 . . . N are identified as affected, as shown in FIG. 4A.

According to an exemplary embodiment, an external memory such as the memory 150 may store a table identifying a security incident, isolated sources involved in the security incident, and their attributes. For example, if a security incident is an unsigned process, the table may have an identification of the security incident 501, as shown in FIG. 5. The incident information for the security incident may include a code identifying a type of the security incident e.g., code 0x3 to identify an unsigned process, a time stamp information indicating when the unsigned process occurred, a unique serial code assigned to this security incident. The incident information may further include contextual data such as input into the unsigned process and an output of the unsigned process e.g., data modified by the process. This contextual data is provided by way of an example and not by way of a limitation. Other attributes may also be provided in the incident information, including but not limited to whether the process is a background process, whether the process is a startup process, whether the process involves other user devices, whether the process is across multiple applications, and so on.

The table 500 in FIG. 5 may further include each entity 502 affected in the security incident. For each entity, according to an exemplary embodiment, type of the entity, identification information, location where the entity is located on a user device, and a current storage location for the entity or image thereof in an external memory may be provided. Additionally, in an exemplary embodiment, other attributes may also be stored, including names of modified files, changes to settings of the entity, and so on. Also, type of involvement in the security incident may be identified. For example, as shown in FIG. 5, the affected outlook application may be a source of the unsigned process and the affected PDF application may have been used to generate output of the unsigned process which was then transmitted to multiple other user devices via the outlook application. Additional affected sources may be the operating system which launched both applications. This is provided by way of an example and not by way of a limitation.

The table 500 of FIG. 5, may further include a column for each affected entity to indicate whether the entity has been suspended on a respective user device, according to an exemplary embodiment. As shown in FIG. 5, in column 503, the outlook application and the pdf application have been disabled while the operating system is not suspended. In other words, in an exemplary embodiment, the outlook application and the pdf application can no longer be used on a user device 1 but since the operation system has not been disabled or suspended, the user device 1 may be used to run other processes e.g., Internet. Additional information regarding the disabling may be provided such as whether the application has been deleted from the device 1, temporal information regarding when it was deleted, files used by the application after the security incident and before it is disabled, and so on may also be included by way of an example and not by way of a limitation. The table 500 in FIG. 5 may also include a column 504 indicating analysis results and whether the entity has been released and providing temporal data for the release.

Since the security incidents are analyzed in real-time, on the fly, as they occur, this allows to minimize damage caused by the security incidents. Also, in various exemplary embodiments, the sources are isolated which prevent further damages and/or contamination of the network. Moreover, according to various exemplary embodiments, a network administrator, a user, and/or the system may quickly, in real time and on the fly, identify affected resources and minimize damage and contamination by the resources. Additionally, the resource may be analyzed and released when ready. In various exemplary embodiments, it is possible to manage various affected resources individually and suspend them on per need basis as opposed to shutting down an entire user device. As such, a more targeted approach to the security incident is provided.

The principles of the invention are implemented as hardware, firmware, software, or any combination thereof. Moreover, the software is preferably implemented as an application program tangibly embodied on a program storage or a transitory or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other exemplary embodiments may be achieved without departing from the scope and spirit set forth herein. All such exemplary embodiments are included herein. The scope of an inventive concept should be limited solely by the claims thereto and their equivalents.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or acts for performing the function in combination with other claimed elements as specifically claimed. The description of the exemplary embodiments has been presented for purposes of illustration and description, but is not intended to be exhaustive or limiting in the form disclosed. Many modifications and variations will be apparent to those of ordinary skill in the art without departing from the scope and spirit of the inventive concept. Exemplary embodiments were chosen and described in order to best explain the principles and the practical application, and to enable others of ordinary skill in the art to understand the inventive concept for various embodiments with various modifications as are suited to the particular use contemplated.

One exemplary embodiment resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice one or more exemplary embodiments that the memory and the processor be physically located in the same place. That is to say, it is foreseen that the processor and the memory might be in different physical pieces of equipment or even in geographically distinct locations. One or more exemplary embodiments are necessarily rooted in computer technology and are in a field of network and computer security. They are inextricably tied to a computer technology and address a problem specifically arising in a realm of computer networks.

One exemplary embodiment also has a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like. As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of the inventive concept that an actual user ever interact with the user interface. It is also not necessary, for the purposes of the inventive concept, that the interaction with the user interface be performed by an actual user. That is to say, it is foreseen that the user interface may have interaction with another program, such as a program created using macro programming language statements that simulate the actions of a user with respect to the user interface.

Exemplary embodiments were chosen and described in order to explain operations and the practical application, and to enable others of ordinary skill in the art to understand various exemplary embodiments with various modifications as are suited to the particular use contemplated. That is, various modifications to these exemplary embodiments will be readily apparent to those skilled in the art, and the generic principles and specific examples defined herein may be applied to other embodiments without the use of inventive faculty. For example, some or all of the features of the different exemplary embodiments discussed above may be combined into a single embodiment. Conversely, some of the features of a single exemplary embodiment discussed above may be deleted from the embodiment. Therefore, the inventive concept is not intended to be limited to the exemplary embodiments described herein but is to be accorded the widest scope as defined by the limitations of the claims and equivalents thereof.

What is claimed is:

1. A method comprising:
    analyzing forensic data collected from a plurality of devices connected to a network, wherein the forensic data collection is ongoing;
    detecting a first security incident based, at least in part, on comparing the forensic data with regular behavior patterns associated with at least one of the network and the plurality of devices;
    based on detecting the first security incident, identifying at least a first resource affected by the first security incident based, at least in part, on attributes of the forensic data;
    isolating the first resource from the network based on identifying the first resource as affected by the first security incident; and
    storing information about the first resource in association with indication of the first security incident and indication of the isolating.

2. The method of claim 1, further comprising:
    determining the regular behavior patterns associated with at least one of the network and the plurality of devices; and
    identifying the first security incident based on identifying irregular behavior in the forensic data based, at least in part, on the regular behavior patterns, wherein the forensic data comprises attributes of an event of irregular behavior.

3. The method of claim 1, wherein storing information about the first resource comprises storing the information in external memory, wherein the external memory is inaccessible to the plurality of devices.

4. The method of claim 1, wherein storing the information comprises storing a data structure in external memory, wherein the data structure comprises at least a first field which identifies the first security incident, a second field which identifies the first resource affected by the first security incident, a third field which comprises attributes of the first resource, and a fourth field indicating whether the first resource is isolated in a respective device.

5. The method of claim 1, wherein the first resource is a first device of the plurality of devices, and wherein isolating the first resource from the network comprises disconnecting the first device from the network.

6. The method of claim 1 further comprising outputting a notification indicating that the first security incident occurred, wherein the notification indicates the isolating of the first resource.

7. The method of claim 1, further comprising installing agents on the plurality of devices, wherein the agents collect the forensic data from the plurality of devices.

8. The method of claim 1, wherein the first resource is a first application, and wherein isolating the first resource comprises requesting a corresponding one of the plurality of devices to disable the first application, obtaining identification information of the first application, and forwarding the identification information to an external memory for storage.

9. The method of claim 1, wherein the first resource is a first application, and wherein isolating the first resource comprises requesting a corresponding one of the plurality of devices to remove the first application from memory of the corresponding device and to delete an executable of the first application.

10. The method of claim 9 further comprising storing at least a portion of the first application in external memory.

11. The method of claim 1, wherein the first resource is a first process, and wherein isolating the first resource comprises stopping allocation of central processing unit time to the first process and changing the name of the first process.

12. One or more non-transitory machine-readable media comprising program code for security incident remediation, the program code to:
analyze forensic data collected from a plurality of devices connected to a network, wherein the forensic data collection is ongoing;
detect a first security incident based, at least in part, on comparison of the forensic data with at least a first regular behavior pattern associated with at least one of the network and the plurality of devices;
based on detection of the first security incident, identify at least a first resource affected by the first security incident based, at least in part, on attributes of the forensic data;
isolate the first resource from the network based on identification of the first resource as affected by the first security incident; and
store information about the first resource in association with indication of the first security incident and indication of the isolating.

13. The non-transitory machine-readable media of claim 12 further comprising program code to install agents on the plurality of devices, wherein the agents collect the forensic data from the plurality of devices.

14. The non-transitory machine-readable media of claim 12, wherein the program code to store information about the first resource comprises program code to store the information in external memory, wherein the external memory is inaccessible to the plurality of devices.

15. The non-transitory machine-readable media of claim 12, wherein the first resource is a first device of the plurality of devices, and wherein the program code to isolate the first resource from the network comprises program code to disconnect the first device from the network.

16. An apparatus comprising:
a processor; and
a machine-readable medium having program code executable by the processor to cause the apparatus to,
analyze forensic data collected from a plurality of devices connected to a network, wherein the forensic data collection is ongoing;
detect a first security incident based, at least in part, on comparison of the forensic data with regular behavior patterns associated with at least one of the network and the plurality of devices;
based on detection of the first security incident, identify at least a first resource affected by the first security incident based, at least in part, on attributes of the forensic data;
isolate the first resource from the network based on identification of the first resource as affected by the first security incident; and
store information about the first resource in association with indication of the first security incident and indication of the isolation.

17. The apparatus of claim 16, further comprising program code executable by the processor to cause the apparatus to:
determine the regular behavior patterns associated with at least one of the network and the plurality of devices; and
identify the first security incident based on identifying irregular behavior in the forensic data based, at least in part, on the regular behavior patterns, wherein the forensic data comprises attributes of an event of irregular behavior.

18. The apparatus of claim 16, wherein the program code executable by the processor to cause the apparatus to store information about the first resource in association with indication of the first security incident and indication of the isolating comprises program code to store the information in an external memory, wherein the external memory is inaccessible to the plurality of devices.

19. The apparatus of claim 16, wherein the first resource is a first application, and wherein the program code executable by the processor to cause the apparatus to isolate the first resource comprises program code to request a corresponding one of the plurality of devices to remove the first application from memory, delete an executable of the first application, and forward an image of the first application for analysis.

20. The apparatus of claim 16 further comprising program code executable by the processor to cause the apparatus to output a notification indicating that the first security incident occurred, wherein the notification indicates the isolation of the first resource.

* * * * *

UNITED STATES PATENT AND TRADEMARK OFFICE
CERTIFICATE OF CORRECTION

PATENT NO. : 10,616,245 B2
APPLICATION NO. : 14/952326
DATED : April 7, 2020
INVENTOR(S) : Gil Barak and Shai Morag Page 1 of 1

It is certified that error appears in the above-identified patent and that said Letters Patent is hereby corrected as shown below:

On the Title Page

Item (71) Applicant portion reading "Pao Alto Networks, Inc." should read --Palo Alto Networks, Inc.--

Signed and Sealed this
Nineteenth Day of May, 2020

Andrei Iancu
*Director of the United States Patent and Trademark Office*